Figure 1:
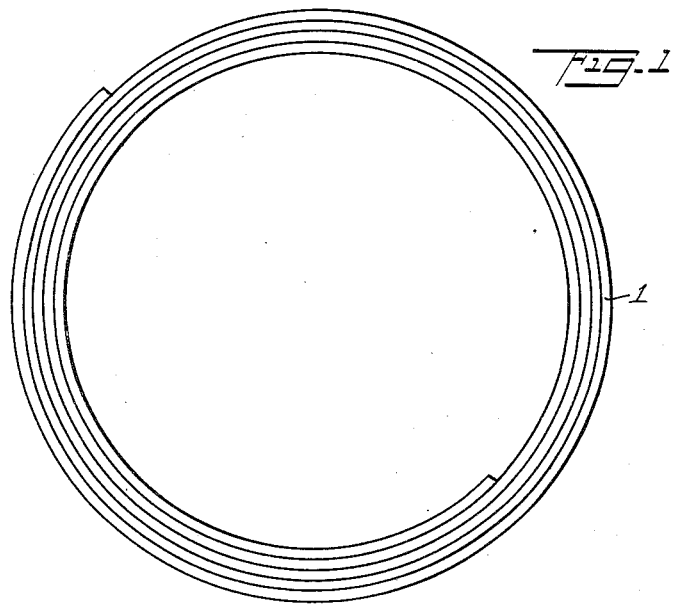

Oct. 31, 1933.  H. ABERT ET AL  1,932,919
MOLDED BRAKE LINING
Filed July 8, 1929

Patented Oct. 31, 1933

1,932,919

UNITED STATES PATENT OFFICE 1,932,919

MOLDED BRAKE LINING

Hamilton Abert, New York, N. Y., and Albert Whitelaw, Passaic, N. J., assignors, by mesne assignments, to Raybestos-Manhattan, Inc., Passaic, N. J., a corporation of New Jersey Application July 8, 1929. Serial No. 376,639

5 Claims. (Cl. 188—250)

Our invention relates to a material which is usable particularly as a lining for the brakes of automobiles.

One of our objects is to produce a strip of brake lining with a circumferentially-continuous, homogenous, unwoven, hard and smooth outer braking surface and which is of such shape and characteristics that a repair shop will be able to fit most sizes of standard brake drums with a dense hard-surfaced lining without having to carry in stock the many different curvatures and lengths now necessary.

A brake lining for internal brakes, in order to give long wear and maintain a uniform co-efficient of friction while wearing through its usable thickness, should be relatively hard and of a dense non-laminated structure, with the consequence that when made of the usual combinations of unwoven asbestos fibre and bonding materials, it is readily fractured when materially bent. It should have a curve approximating that of the brake drum which it is to fit. It should be somewhat flexible so that it may be readily fitted to the brake drums of the ordinary car and not require the garage owner to keep a large stock of sizes. It should hold rivets. It should be hard and dense and yet not materially deform in cross-section when slightly flexed. These requirements are so diverse and apparently unreconcilable that it has been customary to use brake linings which sacrifice some of these features, in other words to employ compromise structures.

The great majority of brake drums of present-day automobiles vary from ten to eighteen inches in diameter. A band of asbestos fabric,—with or without a wire mesh reinforcement,—which is readily flexible and so can be rolled up, provides a construction from which any desired length may be cut, and is readily flexible to fit any size brake drum; but as it is very flexible it does not have the hard friction surface and dense structure which is desirable in a brake lining. It soon wears out.

On the contrary, linings which have the desired friction surface and dense structure are well adapted to retain rivets and have a considerable wearing life, but will crack if materially bent.

If they are hard and dense and made in straight pieces, it is impossible to fit them to standard curvatures of brake drums without the necessary flexure developing fractures or high spots such as cause the brakes to squeak. When such a piece is bent materially, the outer side is put under tension and the inner side under compression with the result that the outer surface, even if it has been previously ground perfectly flat and true, as it should be, is deformed transversely of the strip and thus develops high spots along its edges which prevent the brakes being set with the proper clearance between the brake lining and the drum. This defect has been commonly avoided by molding the desired hard-surfaced, dense-structured material into such lengths and with such permanent curvatures as will fit various sizes of brake drums. But this requires a repair shop to keep in stock the various lengths and curvatures required. This ties up much capital, not to mention the loss in deterioration or obsolescence of the least used sizes.

Heretofore the art has considered that it was impossible to devise a brake lining which would at the same time embody the desired hard surface and dense structure (and so relatively inflexible) characteristics and yet combine the antagonistic requirements above mentioned and avoid the various objections to the types of prior-used linings. In our lining we have accomplished this result. Broadly speaking we provide a brake lining strip which has the desired surface hardness, dense structure and heat-resisting qualities and which is ground to a uniform thickness and with a circumferentially-continuous flat outer surface, which may be supplied in rolled-up form, i. e. in separated convolutions, with curvatures approximating those of standard size brake drums and which has such an inter-particle arrangement and internal stress-balance as produces an inherent set in the convolute form while being somewhat flexible and resilient so that it may be slightly bent without cracking to fit the various sizes of brake drums. A strip can be cut therefrom which will almost fit any standard drum and can be slightly flexed to fit accurately without cracking or substantial deformation. The repair shop therefore has available brake lining in rolled-up form which has the desirable characteristics of dense structure, very hard surface, ability well to retain rivets and already-curved shape, without the necessity of stocking the various lengths and curves which may be needed. This also relieves him of the necessity of supplying inferior brake material if he does not care to carry a special stock of various sizes of previously-shaped strips.

We are aware that our invention may be made in various embodiments and produced by process steps other than those hereafter particularly described. We have in the following description set forth one illustrative structure and process by which our improved results may be secured.

In the drawing—

Figure 2:
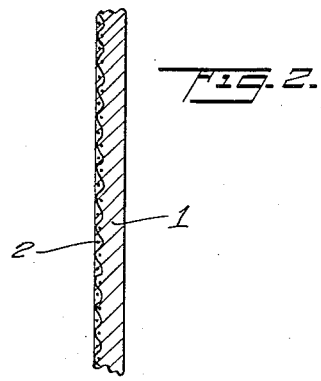

Figure 1 is a strip, made as herein contemplated, in permanent convolute form; and Figure 2 is a transverse section through this strip.

The strip may be formed out of a composition of rubber and asbestos, or some other suitable friction material preferably of a fibrous nature, together with such other ingredients as may be desired. Such composition may be shaped to a desired strip form, ground accurately to size and shape, formed into the desired convolute shape and then vulcanized to the desired degree of hardness e. g., so as to give a permanent but somewhat flexible set in convolute form, i. e., so that it will assume a convolute form even if slightly flexed and released.

Various compositions may be employed, but as an example we may take—

|  | Pounds |
| --- | --- |
| Rubber | 10 |
| Asbestos fibre | 46 |
| Magnesium carbonate | 4 |
| Litharge | 10 |
| Barytes | 25 |
| Sulphur | 5 |
|  | 100 |

With the above may be used any suitable rubber solvent which gives the desired plasticity for molding.

The proportions and ingredients of course may be varied to suit conditions, but they should be such as will when treated as hereafter described, produce a hard-surfaced, dense-structured material. The above material is mixed, e. g. in the usual dough mixer, and is then called "pulp". It is like putty with the fibres incorporated in it and distributed throughout the mass.

The pulp is then formed into a strip 1 of cross-section slightly larger than is required in the finished strip. This may be accomplished by any suitable process such as rolling, cutting, extruding or otherwise. We prefer to extrude the pulp through a die which has a smooth-surfaced rectangular opening and which will form the strip into the desired cross-sectional shape. The extrusion process (well known in various arts and therefore not necessary to be described more particularly here) has several advantages which are important in brake lining material or the like whether made in convolute shape or molded accurately to fit the drum and shoe with which it is to be used. The extrusion process, however, as applied to the production of brake lining generally does not constitute a part of the invention claimed herein but is the subject matter of a co-pending application of George A. Novak, Serial No. 287,046, filed June 20, 1928, Patent No. 1,785,701, issued December 16, 1930. However, the extrusion process is possessed of certain advantages which make it peculiarly adapted to the production of brake lining in convolute form according to the present invention. In particular the fact that the fibers within the strip are in random arrangement lying in all directions, gives to the material an integrity and a freedom from any lines of cleavage which is particularly important when the hard vulcanized material is flexed to adapt it to different sizes of brake shoes or drums; whereas the fact that near the surface of the material the fibers lie more uniformly in a longitudinally direction gives a maximum strength, resistance to wear and coefficient to friction. This longitudinal orientation at the surface of the strip is a result of the troweling action of the sides of the die when the material is pushed over them during the extrusion and is therefore almost entirely a surface effect which does not lessen the random arrangement of the fibers in the interior of the strip. The advantage of such a strip is in contrast particularly with the type of hard brake lining which is made by the accretion method and is therefore essentially a series of thin laminations with relatively very little interlocking of the fiber between the laminations. The flexing of such a strip which sets up unequal stresses of the material tends to cause a cleavage along the lines of the laminations thus limiting more closely than with an extruded lining the extent to which the strip may be flexed to adapt it to various sizes of drums.

The strip when extruded should be of such thickness that it may be considerably reduced by the "press-curing" step hereafter mentioned. The strip should then be dried, for about six hours at approximately 240° F. more or less depending on the composition. It may then be shaped to substantially the cross-section desired by passing the pulp through suitable pressing rolls such as the well-known "Blackrock" calender. A wire fabric 2 may also be added. Preferably this fabric is of woven asbestos-covered wire. The pulp is forced into its interstices but so as to leave the fabric exposed on one surface.

The strip should then be compacted and soft-vulcanized or "press-cured" to the extent necessary to give it body and the coherence sufficient to enable it to be handled. This may be done in any well-known type of "follower" mold which exerts a pressure of 1000 or 1500 pounds and is suitably heated. The pressure reduces its thickness and compacts the material. It is not necessary to specify the degree of heat or the length of time the material is subjected thereto, as this will depend on the composition of the pulp. It is an operation well known in rubber manufacture. No further instructions as to this need be given to a person skilled in the art.

The strip is then bent around, with the wire fabric (if used) on the inner face, into the desired final curved shape. This is preferably the convolute form as shown in Figure 1 and with its curves approximating those of standard brake drums. This may readily be done, for in its soft-vulcanized condition the material is relatively soft and flexible, and the necessary flexure need not set up any such stresses as will materially deform the strip from a perfectly smooth surface.

This strip in convolute form is then vulcanized in any suitable manner to the desired degree of hardness. This final vulcanization may be carried to any degree necessary to accomplish the result desired. The heat should preferably be gradually applied. This serves initially to soften the composition somewhat and allow the particles to rearrange themselves so that internal stresses are substantially eliminated or balanced. When the vulcanization is completed, the strip is hard. We prefer to vulcanize the strip to a hardness which will give a Brinell test of 10 to 25 when using a 3000 kilogram load on a flat-surfaced round foot of ¾ inch diameter with reading taken 30 seconds after load is applied. The vulcanized material is slightly flexible and resilient, however, and the internal stresses are substantially balanced. The consequence is that the strip then has a permanent set in convolute form and the curves approximate those of standard brake drums. While it is still slightly flexible,—enough so that it can be bent slightly to fit the drum to which it is apppplied,—it should preferably be as hard as possible without causing the material to crack until it is flexed materially beyond what is required to accommodate it to the range of brake drums for which it is intended.

We prefer to carry the vulcanization to an extent such that the strip is flexible without cracking to a curvature having a radius of about 20 times its finished thickness but not to one having a radius of 10 times its thickness. The degree of hardness of course may be varied by the extent of vulcanization employed.

The strip may then be ground perfectly smooth on one or both sides by passing it through a suitable grinding machine which reduces it to the uniform thickness desired and makes the friction surface, or surfaces, perfectly smooth and true. If an asbestos-covered wire fabric is used as shown in the drawing, grinding the strip on both faces results in a brake lining which may be of different coefficient of friction on its inner face than on its outer face. Consequently, the lining may be used either upon an external or an internal braking surface. In order to insure a perfectly smooth surface, the strip may, if desired, be rolled between rolls which have a clearance which is somewhat concave-convex of the strip, the wire fabric being placed in the present example next to the convex roll. This rolling may be omitted if desired, and the grinding of the strip may be carried out just previous to the hard vulcanization step if considered preferable for any reason.

The curvatures approximate those of the drums to which the lining is to be applied, so a section of the length desired can be cut from it and readily fitted by the repair man. The heat generated by the use of the material in the ordinary braking operation will serve further to vulcanize and harden the composition.

We are aware that our invention may be carried out in various embodiments and by various steps other than those abovementioned and the steps need not, in all cases, follow each other in the order mentioned above. We therefore do not limit ourselves to the specific construction or steps or particular composition above described.

We claim:

1. A brake lining which comprises a plastic composition, including a refractory friction material, hardened in a convolute strip of more than one turn and having a uniform thickness throughout, the hardening being to such degree that the strip may be bent without fracture to any curvature between the radii of 5 and 9 inches, but not to a curvature of radius 10 times its thickness.

2. A brake lining which comprises a rubber composition including a refractory friction material and hard vulcanized in a convolute strip of more than one turn and of uniform thickness throughout, the vulcanization being to a degree short of complete hardening such that the strip may be bent to any curvature between the radii of 5 and 9 inches, but not to a curvature of radius of 10 times its thickness.

3. A brake lining comprising a composition including a fibrous material and a hardened binder, the fibres thereof being in random arrangement substantially without cleavage, but having predominantly longitudinal arrangement, the composition being in convolute strip form with more than one turn in the convolution and the hardness of the strip being such that any turn thereof may be bent to any curvature between the radii of 5 and 9 inches, but not to a curvature of radius of 10 times its thickness.

4. A brake lining which comprises a composition including a refractory friction material and a hardened binder, in strip form, ground to a uniform thickness, with a circumferentially continuous, flat surface, and in a convolution of more than one turn, the curvatures of which vary within the range of radii between 5 and 9 inches, said strip being capable of bending to any curvature within said range, and the hardness of said strip being between 10 and 25 Brinell, tested with a 3000 kg. load on a ¾ inch round flat-surfaced foot applied for 30 seconds.

5. A brake lining strip which comprises a hardened composition including rubber, a refractory friction material, and vulcanizing ingredients adapted to convert the rubber into hard rubber upon heating, said composition being incompletely cured in a convolute form of more than one turn, so that it is still capable of flexing to any curvature between the radii of 5 and 9 inches and being capable of further vulcanization to increased hardness by heat developed by friction during use.

HAMILTON ABERT.
ALBERT WHITELAW.